Dec. 10, 1957  R. W. JENSEN  2,815,705
BUTTERFLY TYPE SAFETY VALVE
Filed Nov. 10, 1953  3 Sheets-Sheet 1

RAYMOND W. JENSEN.
INVENTOR.

BY John H. T. Wallace

Dec. 10, 1957  R. W. JENSEN  2,815,705
BUTTERFLY TYPE SAFETY VALVE
Filed Nov. 10, 1953  3 Sheets-Sheet 2

RAYMOND W. JENSEN,
INVENTOR.

BY John H.G. Wallace

Dec. 10, 1957  R. W. JENSEN  2,815,705
BUTTERFLY TYPE SAFETY VALVE
Filed Nov. 10, 1953  3 Sheets-Sheet 3

RAYMOND W. JENSEN,
INVENTOR.

BY John H. G. Wallace

United States Patent Office 2,815,705
Patented Dec. 10, 1957

2,815,705

BUTTERFLY TYPE SAFETY VALVE

Raymond W. Jensen, Encino, Calif., assignor to The Garrett Corporation, Los Angeles, Calif., a corporation of California Application November 10, 1953, Serial No. 391,241

17 Claims. (Cl. 98—1.5)

This invention relates generally to valve mechanisms and more specifically relates to a combination pressure relief, vacuum relief and dump valve.

While the invention has particular utility in connection with ventilation of pressurized aircraft cabins and the like, and is shown and described herein as embodied in a cabin pressurization and air conditioning system, it is to be understood that the utility thereof is not specifically limited thereto.

In the pressurization of aircraft cabins for flight at altitudes substantially above sea level, it has become established practice to provide a blower or cabin air compressor whereby air for ventilation and cabin pressurization purposes may be taken from the ambient atmosphere, compressed by the compressor, and delivered in breathable form to the cabin. In order to regulate the pressure existing in the cabin at various altitudes, it has also become accepted practice to provide a cabin pressure regulator, having a suitable cabin air outflow valve associated therewith, that will maintain the cabin pressure on a predetermined schedule commensurate with the aircraft altitude and corresponding ambient atmospheric air pressure. Additionally, it is also the present recognized practice to install other valve mechanisms that will provide for the escape of cabin air to atmosphere or for the entrance of atmospheric air to the cabin under certain operating conditions as will be explained hereinafter.

In aircraft adapted for high altitude flight, difficulties may be encountered in the control of the air pressure in the cabin thereof. For example, at extreme altitudes, if a malfunction should occur in a cabin pressure regulator, it is desirable to have a positive pressure relief valve for venting any excessively high pressure cabin air to the ambient atmosphere when the differential pressure between the cabin air and atmospheric air approaches the safe structural limit of the cabin or other pressurized enclosure within the craft. This practice is followed in order that such a safe differential pressure limit will not be exceeded thus to cause possible damage to the aircraft. Furthermore, pressure surges may occur in the compressed air being delivered to the cabin, the cabin pressure regulator often being incapable of immediate pressure relief operation even though operating satisfactorily otherwise. In such an instance, it is therefore desirable that auxiliary pressure relief valve mechanisms be provided to vent cabin pressure surge air to the ambient atmosphere as rapidly as possible.

If, for various reasons, ambient atmospheric air pressure should exceed cabin air pressure, it is generally desirable to provide valve mechanism that will permit ambient atmospheric air to enter the cabin and thus nullify a so-called "negative" cabin pressure or "vacuum" differential. A condition of this nature might be encountered should the aircraft proceed into a steep dive and the cabin pressure regulator be incapable of permitting reverse air flow.

In another circumstance, it is often desirable that equalization between cabin and atmospheric pressure be rapidly accomplished. A requirement for this condition might occur in a pressurized military aircraft entering a zone of combat, or when an aircraft of any type, having its cabin pressurized, is preparing to land and is flying at a relatively low altitude.

The valve mechanism of the present invention accomplishes the hereinbefore described relief functions in a novel manner, it being an important object of the present invention to provide a valve mechanism that combines the functions of positive pressure relief, manual dump and selective electrically controlled dump in one unitary structure.

Another object of the present invention is to provide a novel valve mechanism of the character previously described that operates pneumatically to accomplish the beforementioned functions.

A further important object of the present invention is to provide a combination pressure relief, vacuum relief and manual dump valve that is comparatively small in size, light in weight, simple in operation and maintenance, and capable of being produced at a relatively low cost while still providing an efficient device to handle the amount of air flow necessary upon initiation and during operation of the relief functions.

A still further important object of the invention is to provide a combination pressure relief, vacuum relief and dump valve, incorporating a balanced butterfly valve member for controlling air flow intermediate a pressurized enclosure and ambient atmosphere.

A further object of the present invention is to provide a combination pressure relief, vacuum relief and dump valve incorporating a butterfly valve member and including a single diaphragm actuating structure.

Another important object of the present invention is to provide a novel actuating mechanism for a combination pressure relief, vacuum relief and dump valve wherein the spring load on an actuating diaphragm is combined with a positive fluid pressure to maintain a valve member in a closed position, this positive loading thus alleviating the requirement for critical mounting locations of the valve in the aircraft.

Still another important object of the invention is to provide a combination pressure relief, vacuum relief and dump valve that is not adversely effected by local vibrations, is reliable and efficient in use, and which occupies a space substantially smaller than formerly required for like structures.

Other and further important objects of the present invention will become apparent from the disclosures in the following specification, appended claims and accompanying drawings, wherein:

Figure 1:
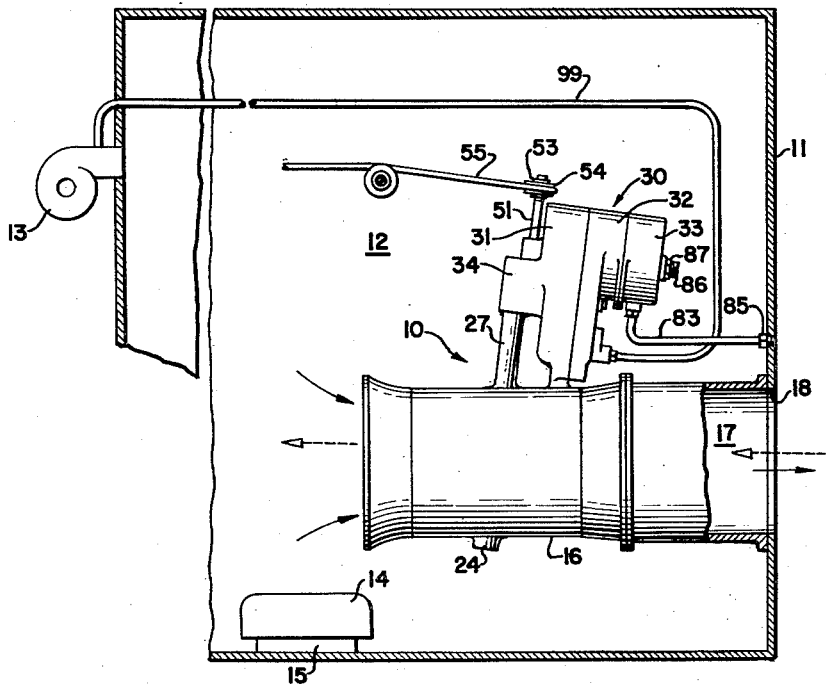
Fig. 1 is a fragmentary schematic view of a portion of a pressurized enclosure showing the present valve mechanism installed therein.

Referring to the drawings, and primarily to Fig. 1, the valve mechanism of the present invention is indicated generally at 10. As shown, the valve mechanism is adapted to be secured to a wall 11 of a suitable enclosure 12, such as, for example, an aircraft cabin. Compressed air, for ventilation and pressurization of the enclosure 12, is adapted to be supplied to the enclosure from a blower or compressor 13, the pressure of the air within the enclosure being adapted to be normally regulated, for example, by means of a suitable cabin pressure regulator 14, including an outflow valve mechanism shown schematically at 15.

Figure 2:
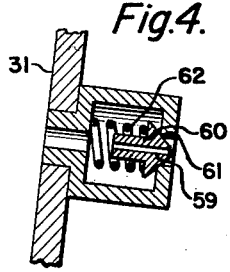
Fig. 2 is a semi-schematic transverse sectional view of the combination pressure relief, vacuum relief and dump valve of the present invention.

With reference primarily to Fig. 2, the valve mechanism 10 is shown as comprising a passage structure in the form of a duct 16 defining a passage 17 from the enclosure 12 to ambient atmosphere by way of an opening 18 (Fig. 1) in the wall 11 of the enclosure. An annular butterfly valve member 19 is disposed normally in a closed position transversely in the passage 17 and is provided about the periphery thereof with a resilient piston-ring-like sealing member 20. When the valve 19 is in a closed position, as shown in Fig. 2, the member 20 is adapted to engage the inner wall of the passage 17. The valve 19 is angularly disposed on a shaft 21, the shaft 21 having a stub portion 22 that extends through the wall of the duct 16 and is thereafter journaled in a suitable bearing 23. The bearing 23 is held in a retainer or boss 24 projecting outwardly from the outer wall of the duct 16. The upper end of the shaft 21 is journaled in suitable bearing and seal combinations 25 and 26 mounted in a stem portion 27 that is disposed outwardly from the outer surface of the duct 16. The outer end of the shaft 21 is provided with serrations 28 to enable rigid engagement with one portion of a suitable compound linkage mechanism, indicated generally at 29.

A valve body, indicated generally at 30, comprises an end portion 31, formed integrally with the duct structure 16, an intermediate portion 32 and a pilot valve cap portion 33. The valve body portion 31 has an extension 34 that is connected to, or may be formed integrally with, the stem 27 to provide a housing for the compound linkage mechanism 29. The interior spaces within the end portion 31 and the extension 34 communicate with each other, fluid flow therefrom being prevented by the sealing portions of the seal and bearing combinations 25 and 26.

Figure 3:
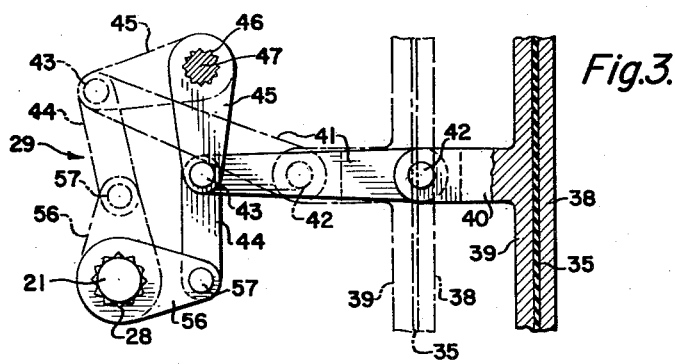
Fig. 3 is a fragmentary sectional detail view showing the compound linkage mechanism employed with the present valve mechanism.

A primary flexible diaphragm 35 provides a movable wall between a chamber 36, formed in the body end portion 31, and a chamber 37 formed in the intermediate body portion 32. The diaphragm 35 is provided with stiffening plates 38 and 39, plate 39 being adapted, at the central area thereof, to support a bifurcated stud 40. With reference primarily to Figs. 2 and 3, the stud 40 has one end pivotally connected to a link 41 as by a pin 42. The other end of the link 41 is pivoted on a pin 43 and, by means of the pin 43, is pivotally connected to a link 44 and a crank 45, the crank 45 being secured on splines 46 formed on the lower end of a stub shaft 47. The link 44 and the crank 45 are normally in co-extensive alignment, as shown by the solid lines in Fig. 3, and are adapted to be moved to the dotted line position upon movement of the diaphragm 35 in a manner and for a purpose to be hereinafter more fully described.

The stub shaft 47 is journaled in suitable bearings 48 and 49 mounted in the extension 34 of the body portion 31. The upper end of the stub shaft 47 is provided with a clutch in the form of step 50 that is adapted to be engaged by a complementary step formed on the lower end of a shaft 51, the shaft 51 being journaled in a bearing 52 positioned co-axially with the bearings 48 and 49. The upper end of the shaft 51 is fitted with suitable splines 53 upon which a pulley 54 is adapted to be mounted. A cable 55 is arranged to engage the pulley 54 and to rotate the shaft 51 in a manner and for a purpose to be hereinafter more fully described.

The link 44, having one end pivoted on the pin 43, has its other end connected to a crank 56 as by a pivot pin 57, the crank 56 being mounted on the splines 28 formed on the upper end of the shaft 21. It may thus be seemed that, upon movement of the diaphragm 35, opening or closing of the butterfly valve mechanism 19 will be effected through the compound linkage 29 interconnecting the diaphragm 35 and the shaft 21. It may also be seen that considerable mechanical advantage is gained through use of this compound linkage mechanism so that only a slight force will be required to initially crack and further open the valve 19, the construction of the linkage 29 being such that initial movement of the diaphragm 35 toward the chamber 36 will exert considerable torque to open the valve 19, such torque being necessary to overcome the friction induced by the radial outward pressure of the peripheral sealing ring 20 disposed about the valve 19.

Figure 4:
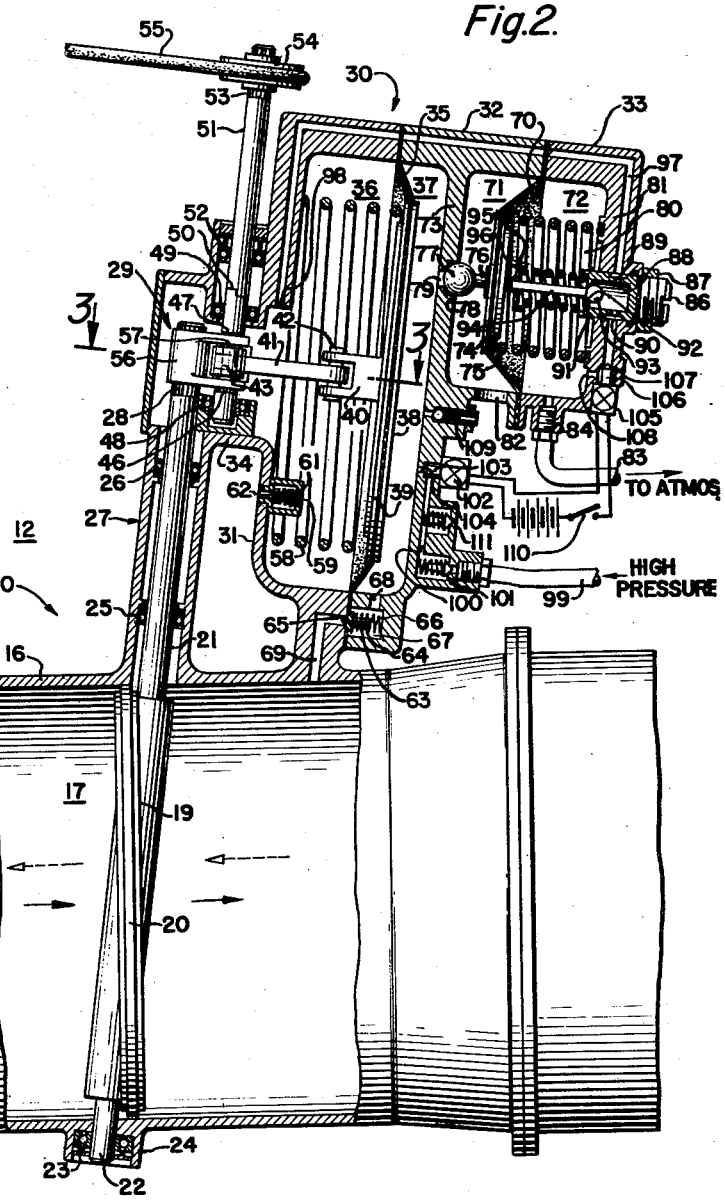
Fig. 4 is an enlarged fragmentary sectional view of one of the poppet valve members employed in the present mechanism.

A compression spring 58 is disposed in the chamber 36 between the plate 39 of the diaphragm 35, and the inner surface of an outer wall of the body portion 31, this spring normally acting to urge the diaphragm rightwardly, as seen in Fig. 2, to thus bias the butterfly valve member 19 toward a closed position. The chamber 36 is also provided with a restricted inlet orifice 59, Figs. 2 and 4, formed axially within a poppet valve 60, the poppet valve 60 being normally urged against a seat 61 by means of a suitable compression spring 62. This arrangement provides a restricted communication between the chamber 36 and the interior of the enclosure 12. In instances when a rapid exhaust of the air in the chamber 36 is desired, the force of such air acting upon the head of the poppet valve member 60 will cause the valve member to leave the seat 61 thereby to provide an enlarged communicating port between the chamber 36 and the interior of the enclosure 12.

A restricted communication between the chamber 37 and ambient atmosphere is provided through a restricting orifice 63, similar to the orifice 59 and formed axially within a poppet valve member 64, the valve member 64 being urged against a valve seat 65 by means of a compression spring 66. The spring 66 and the poppet valve member 64 are positioned in a recess 67 formed in a wall of the intermediate portion 32 of the valve body, there being a passage 68 formed intermediate the chamber 37 and the recess 67. The valve seat 65 is formed on one end of a passage 69 which communicates with a region of lower pressure, such as, for example, ambient atmosphere, the duct 69 terminating at its outer end at the surface of the inner wall of the duct 16 on the side of the butterfly valve member 19 that is exposed to atmospheric pressure. When the ambient atmospheric air pressure exceeds the air pressure normally present in the enclosure 12, the poppet valve member 64 is adapted to leave the seat 65 thus to provide an unrestricted port communication between the chamber 37 and ambient atmosphere.

A secondary flexible diaphragm 70 is mounted between the intermediate portion 32 and cap portion 33 of the valve body, the diaphragm 70 providing a movable wall for adjacent sides of a pair of chambers 71 and 72. Chamber 71 is formed in one side of the intermediate body portion 32 and separated from the chamber 37 by means of a fixed wall 73, the chamber 72 being formed in the body portion 33. The diaphragm 70 has, on each side thereof, centrally disposed supporting and stiffening plates 74 and 75, plate 74 being adapted to support a shaft 76 the end of which is adapted to carry a ball valve member 77. The ball valve member 77 co-operates with a valve seat 78 formed on one end of a short passage 79 through the wall 73, and provides controlled communication between the chambers 37 and 71. The ball valve 77 is biased toward a closed position on the seat 78 by means of a suitable compression spring 80. The spring 80 is disposed in the chamber 72 and acts between the diaphragm plate 75 and a rear wall 81 of the chamber 72.

A suitable opening 82 is formed in the outer wall of the chamber 71 thereby to provide free communication between this chamber and the interior of the enclosure. Air in chamber 72 communicates with ambient atmosphere by means of a conduit 83 which makes threaded connection as at 84 to a side of the cap portion 33. The conduit 83 extends from the threaded connection 84 to the wall 11 of the enclosure 12 and provides a connection with atmospheric air by means of a suitable fitting 85 in the wall 11, Fig. 1.

An adjusting screw 86 is adapted to threadably engage and extend through the rear wall 81 of the body portion 33; a lock nut 87 being provided to secure the adjusting screw 86 in place. The adjusting screw 86 is provided with a centrally disposed axially arranged hollow interior 88 having a radial port 89 extending therefrom and communicating with a peripheral groove 90. The hollow interior 88 has one wall 91 provided with an opening 92. A ball type pilot valve member 93 is adapted to co-operate with the opening 92 to normally close the opening and thereby close pneumatic communication between the chamber 72 and the interior 88 of the adjusting screw 86. A valve stem 94 is connected to and extends from the ball valve 93 to a position normally adjacent to and slightly spaced from the diaphragm plate 75, and is fitted with a spring retainer 95 adjacent the outer end thereof. A relatively light compression spring 96 is disposed between the spring retainer 95 and the wall 91 of the adjusting screw thereby to urge the ball pilot valve 93 into contact with its seat on one end of the opening 92. The opening 92, in co-operation with the pilot valve 93, thus provides controlled communication between the chamber 72 and the hollow interior 88 of the screw 86. The hollow interior 88 is pneumatically connected to the chamber 36 by means of the bore 89, annular groove 90, and a continuous passage 97 that extends radially outwardly through the wall 81, axially through the outer walls of the body portion 33, the intermediate portion 32, and the main body portion 31 of the valve body 30 and into the chamber 36, as at 98.

In operation, and assuming a normal steady state condition with a cabin that is pressurized at some pressure higher than ambient atmospheric air pressure, cabin air pressure will exist in the chamber 36, having been admitted thereto through the restricting orifice 59, and ambient atmospheric air pressure will exist in the chamber 37, having been admitted thereto through the restricting orifice 63. The pressure differential across the diaphragm 35, in addition to the force of the spring 58, acts through the compound linkage 29, as shown in Fig. 2, to maintain the butterfly valve 19 in a closed position within the passage 17. Cabin air pressure also exists in the chamber 71, by reason of the large opening 82 in the wall thereof, and atmospheric air pressure exists in the chamber 72 due to the transmission of atmospheric air to the chamber 72 through the conduit 83. The pressure differential across the diaphragm 70 is such as to tend to unseat the ball valve 77 from its seat 78. However, this ball valve is held in position by the force of the compression spring 80 until the pressure differential across the diaphragm 70 reaches a value necessary to overcome the force of the spring 80 thereby to unseat the ball valve 77. Due to its function, the ball valve 77 may be considered a "ready" valve as it operates to prepare the device for pressure relief operation by venting the higher pressure cabin air to the chamber 37 to thus equalize the pressures in the chambers 36 and 37. Upon such pressure equalization, the butterfly valve 19 is retained in a closed position by means of the compression spring 58.

The predetermined pressure differential that must necessarily exist across the diaphragm 35 to cause positive pressure relief operation of the valve of the present invention, is determined by the position of the inner end of the valve stem 94 in relation to the diaphragm plate 75, in addition to the distance the diaphragm 70 must move in compressing the spring 80 before contact of the plate 75 with the stem 94 and subsequent movement of the ball valve 93 from its seat 92 takes place. When the pressure differential setting, as determined by the position of the end portion of the stem 94, is exceeded, the ball valve 77 will already have left the seat 79 to permit an unrestricted communication between the chamber 37 and the enclosure 12 by way of the chamber 71 and the opening 82. As the diaphragm 70 moves further to compress the spring 80, the diaphragm plate 75 will engage the outer end of the pin 94 to raise the ball valve 93 from its seat in the opening 92 and thus provide a pneumatic connection between the chamber 72 and the chamber 36, by way of the interior 88 of the screw 86 and bore 97. This connection permits atmospheric air to be transmitted to and to exist in the chamber 36. With the chamber 37 now open to the relatively high pressure cabin air, and the chamber 36 in communication with the relatively low pressure atmospheric air, the effective forces acting upon the diaphragm 35 will be the reverse of those forces normally acting thereupon prior to the unseating of the ball valve 77. These forces are adapted to move the diaphragm 35 in a direction to compress the spring 58 and, through the compound linkage 29, to open the butterfly valve member 19 to permit air flow in the direction of the solid arrow. As shown primarily in Fig. 3, considerable mechanical advantage is gained through use of the compound linkage 29. In this connection, it may be seen that, when the diaphragm 35 moves from the solid line position to the dotted line position, the link 41 acts through the toggle arrangement including the link 44 and the crank 45 to rotate the crank 56 and turn the shaft 21. The initial movement of the diaphragm 35 acts in this manner to rotate the crank 56 through a relatively small angle, the relative magnitude of rotation being increased as the crank 56 approaches its dotted line position. Therefore, the mechanical advantage gained through use of the compound linkage 29 is considerably higher during initial movement of the diaphragm 35 to provide additional initial force to move the butterfly valve member 19 from a closed to an open position. The orifice 59 provides communication between the chamber 36 and the enclosure 12, and the orifice 63 provides communication between the chamber 37 and ambient atmosphere. These orifices 59 and 63 are of a considerably smaller area than the passages 79 and 97 thus to allow the beforementioned reversal of the forces acting upon the diaphragm 35 and to provide a desirable amount of pneumatic damping of the valve mechanism.

For vacuum relief operation, that is, when ambient atmospheric air pressure exceeds the pressure of the air in the enclosure 12, the poppet valve 64 will open against compression of the spring 66 in response to the force of the higher pressure existing in the atmospheric end of the duct 16. Atmospheric air is delivered to the valve 64 through the passage 69, and into the chamber 36, by way of the passage 68 thus moving the diaphragm 35. Cabin air pressure, existing in the chamber 36, will slowly bleed out through the orifice 59 or, when the movement of the diaphragm 35 is sufficiently rapid, will unseat the poppet valve member 60 from its seat 61 against the compression of the spring 62, thereby to provide a free communication between the chamber 36 and the enclosure 12. In this condition, a higher air pressure will exist in the chamber 37 than in the chamber 36 thus to create forces effective to move the diaphragm 35 in a direction to compress the spring 58 and, by means of the compound linkage 29, to open the butterfly valve member 19 and permit air flow in the direction of the dotted arrows. As the pressure of the air in the enclosure approaches ambient atmospheric air pressure, due to an inflow of air through the passage 17, the air pressures in the chambers 36 and 37 will also approach the same value thereby to permit the spring 58 to close the butterfly valve member 19.

In order to provide for one type of manual dump operation, high pressure air from any suitable source such as, for example, the discharge of the compressor 13, is delivered through a conduit 99 to a cross bore 100 formed in one wall of the chamber 37, by way of a check valve 101. An electro-magnetically operated valve 102 has an armature-valve member 103 that is adapted to normally occlude a port 104. Upon energization of the valve 102, the port 104 will be opened to provide communication between the cross bore 100 and the chamber 37 thus permitting the delivery of high pressure air from the compressor to the chamber 37. The electromagnetically operated valve 102 is connected in series with a second electromagnetically operated valve 105 that has an armature-valve member 106 adapted to occlude a bore 107. The bore 107 communicates with the annular groove 90 formed on the exterior of the adjusting screw 86. A port 108 provides pneumatic communication between an enlarged bore surrounding the stem of the valve member 106 and the chamber 72. Assuming atmospheric pressure to exist in the chamber 72 by way of the conduit 83, upon energization of the valve 105, relatively low pressure atmospheric air will be transmitted to the chamber 36 by way of the port 108, bore 107, annular groove 90, and bore 97, thereby causing a reduction in air pressure in the chamber 36. Due to the high pressure of compressor bleed air existing in the chamber 37, the effective forces created by the pressure differential across the diaphragm 35 will cause this diaphragm to move in a direction to compress the spring 59 and thereby open the butterfly valve member 19. A pressure regulating check valve 109, positioned in the wall 73 intermediate the chamber 37 and the enclosure 12, insures against the build up of excessive compressor bleed air pressure in the chamber 37 thus to prevent possible explosive rupture of the diaphragm 35.

Should high pressure air, normally delivered through the conduit 99, be unavailable, a switch 110 in a circuit interconnecting the valves 102 and 105, may be closed to energize these valves and thus to open the passages controlled by the respective electromagnetic valve armatures. In this instance, air at cabin pressure will be admitted to the chamber 37, through a suitable check valve 111, and port 104 and the chamber 36 will be exhausted to atmosphere through the bore 107 in the manner previously described in connection with manual dump operation, to cause the diaphragm 35 to move in a direction to open the valve 19.

It may be seen that the cable 55, extending about the pulley 54, provides a manual override means for opening the valve 19. The cable 55 may extend to any suitable position so as to be within reach of the aircraft pilot or other crew member so that, upon rotation of the shaft 51, the stub shaft 47 will be rotated through the clutch 50 thereby to turn the crank 45 and, through the link 44 and crank 56, turn the shaft 21 thereby to open the valve member 19. This manual overriding means may be brought into play should the safety valve fail to operate for any reason.

Figure 5:
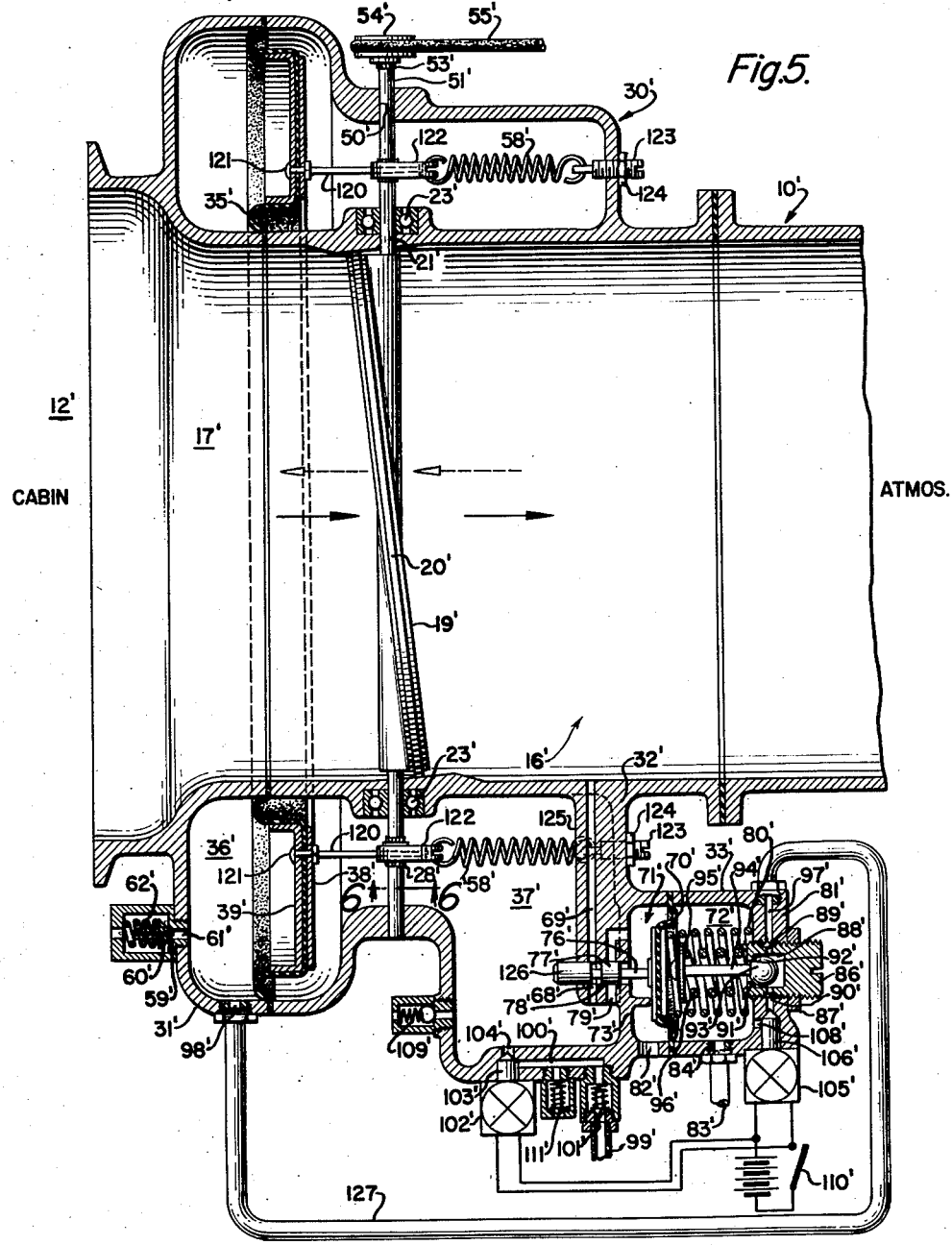
Fig. 5 is a semi-schematic longitudinal sectional view showing a modified form of the present invention.
Figure 6:
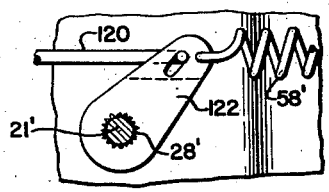
Fig. 6 is a fragmentary view showing a portion of the valve operating mechanism and taken substantially as indicated by line 6—6, Fig. 5.

In Figs. 5 and 6 a modification of the invention is shown wherein like parts are indicated by primed reference characters. In this modified form of construction, an annular diaphragm 35' is disposed about a conduit 16' and secured intermediate annular portions 31' and 32' of a housing 30'. By utilizing this type of construction it is possible to provide a relatively large diaphragm area without the necessity of increasing the envelope of the valve structure.

The diaphragm 35' is centrally supported by means of annular rings 38' and 39', the ring 39' being substantially U-shaped in cross section. The rigid portion of the diaphragm 35', as defined by the area retained intermediate the rings 38' and 39', is operatively associated with an operating shaft 31', of a butterfly valve 19', by means of a pair of axially extending rods 120 that are secured to the diaphragm as at 121. The rods 120 are pivotally anchored in suitable slots in levers 122, these levers being disposed on splined sections 28' carried by the operating shaft 21'.

In the modification of Fig. 5, a pair of tension springs 58' have ends that are secured to the levers 122, their other ends being secured to fittings 123, these fittings being adjustably positioned in a wall 73' by means of suitable nuts 124. The tension springs 58' serve the same purpose as the compression spring 58 utilized in the form of the invention shown primarily in Fig. 2.

The modification of Fig. 5 further differs from the form shown in Fig. 2 in that atmospheric air is transmitted to chamber 37' by means of a bore 69' formed in an enlargement 125 that extends inwardly from the wall 73'. A valve member 126 is disposed in the inner end of the passage 69', a port 68' leading from the valve 126 to the chamber 37'. The valve 126 is connected to a valve 77' which is in turn connected to and adapted to be operated by a rod 76', the rod being secured to the movable portion of a diaphragm 70'. The construction of the valve member 126 together with the valve 77' is such that upon preliminary movement of the diaphragm 70' the passage 69' will be occluded just prior to opening of the valve 77' and opening of a port 79' to provide communication between chamber 37' and a chamber 71' and in turn with the cabin through the port 82'. This preliminary movement of the diaphragm 70' places the valve in a "ready" position by permitting equalization of the air pressures existing in the chambers 36' and 37', the butterfly valve 19' being maintained in a closed position by action of the tension spring 58' through the levers 122. Considering the mechanism being operated as a pressure relief valve, as the diaphragm 70' continues to move in response to an increasing differential air pressure thereacross, due to the lower air pressure existing in a chamber 72', the inner end of a rod 94' is adapted to be engaged by one of the supporting plates of the diaphragm 70' thereby to move a ball valve 93' from its seat 92' to permit the flow of high pressure cabin air from the chamber 36' through a port 98' and a conduit 127 to a passage 97' and into an enlarged bore 88'. From the enlarged bore 88' this high pressure air flows into the chamber 72' and out through a conduit 83' to atmosphere. The lower pressure in the chamber 36' and the higher cabin air pressure existing in the chamber 37' thereby permits the diaphragm 35' to be moved leftwardly, as seen in Fig. 5, to rotate the shaft 21' and the butterfly valve 19' thereby to permit air flow through a passage 17'.

The vacuum relief, manual and electrical dump operations of the valve structure of Fig. 5 are substantially the same as those described in connection with the form of the invention shown in Fig. 2. Manual dump operation is accomplished through the shaft extension 51', a pulley 54', and a cable 55' operating through a clutch 50' to rotate the shaft 21' and open the butterfly valve 19'. Electrical dump operation is initiated by energization of solenoid valves 102' and 105' thereby to transmit high pressure air from any suitable source to the chamber 37' and bleed the chamber 36' to atmosphere. When high pressure air may not be available for delivery through a conduit 99', high pressure cabin air may be admitted to the chamber 37' through a check valve 111'.

It is thus seen that the present combination pressure relief, vacuum relief, and dump valves are of a relatively simple construction and make effective use of the available operating pressures and pressure differentials to permit enclosure of the devices in envelopes considerably smaller than those of previously known structures. Additionally, the present devices may be incorporated in small envelopes due particularly to the use of the butterfly-type valve arrangements, actuation thereof requiring a considerably smaller effective actuator area, as only a relatively small amount of torque is necessary to completely seal the butterfly-type valve 19 and 19' with respect to the ducts 16 and 16'. The amount of torque required to operate the valves is greatest during the initial period of movement from a closed position to an open position, the necessary increased torque during this period being provided through the effective use of the compound linkage 29 or the lever system defined by the rods 120 and levers 122.

I claim:

1. In a relief valve: passage means providing communication between an enclosure and ambient atmosphere; a closure member arranged in and normally adapted to close said passage means; a movable wall; means operatively connecting said movable wall with said closure member; means normally to expose one side of said movable wall to enclosure pressure; means normally to expose the other side of said movable wall to ambient atmospheric pressure; pilot valve means automatically operable, in response to a predetermined differential between enclosure pressure and ambient atmospheric pressure, to reverse the effective forces of said pressures acting upon said movable wall, thereby to open said closure member; and means operable independent from said pilot valve means to reverse said pressures.

2. In a relief valve: passage means providing communication between an enclosure and ambient atmosphere; a closure member arranged in and normally adapted to close said passage means; a movable wall; compound linkage means operatively connecting said movable wall with said closure member; restricted passage means normally to expose one side of said movable wall to enclosure pressure; restricted passage means normally to expose the other side of said movable wall to ambient atmospheric pressure; pilot valve means operable, in response to a predetermined differential between enclosure pressure and ambient atmospheric pressure, to reverse the effective forces of said pressures acting upon said movable wall, thereby to open said closure member; and means operable independent from said pilot valve means to reverse said pressures.

3. In a relief valve: passage means providing communication between an enclosure and ambient atmosphere; a closure member arranged in and normally adapted to close said passage means; a movable wall; compound linkage means operatively connecting said movable wall with said closure member; restricted passage means normally to expose one side of said movable wall to enclosure pressure; restricted passage means normally to expose the other side of said movable wall to ambient atmospheric pressure; pilot valve means operable, in response to a predetermined differential between enclosure pressure and ambient atmospheric pressure, to reverse the effective forces of said pressures acting upon said movable wall, thereby to open said closure member; manually operable means to override said pressures acting upon said movable wall to open said closure member; and electrically operable means independent from said pilot valve means to reverse said pressures.

4. In a relief valve: passage means providing pneumatic communication between a normally pressurized enclosure and ambient atmosphere; a closure member arranged in and normally adapted to close said passage means; a movable wall; means operatively connecting said movable wall with said closure member; pneumatically restricted passage means normally to expose one side of said movable wall to enclosure pressure; pneumatically restricted passage means normally to expose the other side of said movable wall to ambient atmospheric pressure; pilot valve means operable, in response to a predetermined differential between enclosure pressure and ambient atmospheric pressure, to reverse the effective forces of said pressures acting upon said movable wall, thereby to open said closure member; and unrestricted passage means to expose said other side of said movable wall to ambient atmospheric pressure upon such atmospheric pressure becoming greater than said enclosure pressure.

5. In a relief valve: passage means providing pneumatic communication between a normally pressurized enclosure and ambient atmosphere; a closure member arranged in and normally adapted to close said passage means; a flexible diaphragm; means operatively connecting said diaphragm with said closure member; pneumatically restricted passage means normally to expose one side of said diaphragm to enclosure pressure; pneumatically restricted passage means normally to expose the other side of said diaphragm to ambient atmospheric pressure; pilot valve means operable, in response to a predetermined differential between enclosure pressure and ambient atmosphere pressure, to reverse said pressures acting upon said diaphragm and thereby to open said closure member; manually operable means to override said pressures acting upon said diaphragm to open said closure member; electrically operable means independent from said pilot valve means to reverse the effective forces of said pressures; and unrestricted passage means to expose said other side of said diaphragm to ambient atmospheric pressure upon such atmospheric pressure becoming greater than said enclosure pressure.

6. A relief valve comprising, in combination: a passage providing communication between an enclosure and ambient atmosphere; a butterfly valve closure member arranged in and normally adapted to close said passage; a movable wall; means operatively connecting said movable wall with said closure member; means normally to expose one side of said movable wall to enclosure pressure; means normally to expose the other side of said movable wall to ambient atmospheric pressure; a pilot valve having pressure responsive actuating means operable in response to a predetermined differential between enclosure pressure and ambient atmospheric pressure and disposed automatically to reverse the effective forces of said pressures acting upon said movable wall, thereby to open said closure member; manually operable means to override said pressures acting upon said movable wall to open said closure member; and operable means independent from said pilot valve to reverse said pressures.

7. A combination pressure relief, vacuum relief and dump valve comprising: a passage structure providing communication between an enclosure and ambient atmosphere; a valve member disposed in and adapted normally to close said passage structure; a valve body; a chamber formed within said body; a primary diaphragm secured to said body, disposed in said chamber and adapted to divide said chamber into two portions; linkage means operatively connecting said diaphragm with said valve member; a spring arranged in one of said portions and adapted to engage said diaphragm normally to urge said valve member toward a closed position; means normally to deliver enclosure pressure to said one of said portions of said chamber; means normally to deliver ambient atmospheric pressure to the other one of said portions of said chamber; a pair of pilot valves; a secondary diaphragm operatively associated with said pilot valves; means to expose opposite sides of said secondary diaphragm to enclosure pressure and to atmospheric pressure; spring means normally closing said pilot valves; passage means providing communication between said pilot valves and respective portions of said chamber, thereby upon movement of said secondary diaphragm, to reverse the effective forces of said pressures acting upon said primary diaphragm and to open said valve member; and means operable independently from said pilot valves to reverse said pressures.

8. A combination pressure relief, vacuum relief and dump valve comprising: a passage structure providing communication between an enclosure and ambient atmosphere; a valve member disposed in and adapted normally to close said passage structure; a valve body; a chamber formed within said body; a primary diaphragm secured to said body, disposed in said chamber and adapted to divide said chamber into two portions; linkage means operatively connecting said diaphragm with said valve member; a primary compression spring arranged in one of said portions and adapted to engage said diaphragm normally to urge said valve member toward a closed position; restricted passage means normally to deliver enclosure pressure to said one of said portions of said chamber; restricted passage means normally to deliver ambient atmospheric pressure to the other one of said portions of said chamber; a pair of pilot valves; a secondary diaphragm positioned for operation of said pilot valves; means to expose opposite sides of said secondary diaphragm to enclosure pressure and atmospheric pressure; a secondary compression spring normally closing said pilot valves; passage means providing communication between said pilot valves and respective portions of said chamber thereby, upon movement of said secondary diaphragm to reverse the effective forces of said pressures acting upon said primary diaphragm and to open said valve member; and means operable independent from said pilot valves to reverse said pressures.

9. A combination pressure relief, vacuum relief and dump valve comprising: a passage structure providing communication between an enclosure and ambient atmosphere; a valve member disposed in and adapted normally to close said passage structure; a valve body; a chamber formed within said body; a primary diaphragm secured to said body, disposed in said chamber and adapted to divide said chamber into two portions; linkage means operatively connecting said diaphragm with said valve member; a primary compression spring arranged in one of said portions and adapted to engage said diaphragm normally to urge said valve member toward a closed position; restricted passage means normally to deliver enclosure pressure to said one of said portions of said chamber; restricted passage means normally to deliver ambient atmospheric pressure to the other one of said portions of said chamber; a pair of pilot valves; a secondary diaphragm positioned for operation of said pilot valves; means to expose opposite sides of said secondary diaphragm to enclosure pressure and atmospheric pressure; a secondary compression spring normally closing said pilot valves; passage means providing communication between said pilot valves and respective portions of said chamber, thereby, upon movement of said secondary diaphragm, to reverse the effective forces of said pressures acting upon said primary diaphragm and to open said valve member; means operable independent from said pilot valves to reverse said pressures; and manually operable means to override the force of said primary compression spring and said pressures acting upon said primary diaphragm; thereby to open said valve member.

10. A combination pressure relief, vacuum relief and dump valve comprising: a passage structure providing communication between a normally pressurized enclosure and ambient atmosphere; a valve member disposed in and adapted normally to close said passage structure; a valve body; a chamber formed within said body; a primary diaphragm secured to said body, disposed in said chamber and adapted to divide said chamber into two portions; linkage means operatively connecting said diaphragm with said valve member; a compression spring arranged in one of said portions and adapted to engage said diaphragm normally to urge said valve member toward a closed position; a first restricting orifice through which normally to deliver enclosure pressure to said one of said portions of said chamber; a second restricting orifice through which normally to deliver ambient atmospheric pressure to the other one of said portions of said chamber; a pair of pilot valves; a secondary diaphragm operatively associated with said pilot valves; means to expose opposite sides of said secondary diaphragm to enclosure pressure and atmospheric pressure; spring means normally closing said pilot valves; passage means providing communication between said pilot valves and respective portions of said chamber, thereby, upon movement of said secondary diaphragm, to reverse said pressures acting upon said primary diaphragm and to open said valve member; means operable independent from said pilot valves to reverse the effective forces of said pressures; and an unrestricted port associated with said second restricting orifice through which to expose said diaphragm to ambient atmospheric pressure upon such atmospheric pressure exceeding said enclosure pressure.

11. A pressure relief, vaucum relief and dump valve comprising in combination: a passage providing communication between an enclosure and ambient atmosphere; a butterfly valve member disposed in and adapted normally to close said passage; a valve body; a chamber formed within said body; a primary diaphragm secured to said body, disposed in said chamber and adapted to divide said chamber into two portions; compound linkage means operatively connecting said diaphragm with said valve member; a primary compression spring arranged in one of said portions and adapted to engage said diaphragm normally to urge said valve member toward a closed position; a first restricting orifice through which normally to deliver enclosure pressure to said one of said portions of said chamber; a second restricting orifice through which normally to deliver ambient atmospheric pressure to the other one of said portions of said chamber; a pair of pilot valves; a secondary diaphragm operatively associated with said pilot valves; means to expose opposite sides of said secondary diaphragm to enclosure pressure and atmospheric pressure; spring means normally closing said pilot valves; passage means providing communication between said pilot valves and respective portions of said chamber, thereby, upon movement of said secondary diaphragm, to reverse the effective forces of said pressures acting upon said primary diaphragm and to open said valve member; electrical means operable independent from said pilot valves to reverse said pressures; an unrestricted port associated with said second restricting orifice through which to expose said diaphragm to ambient atmospheric pressures upon such atmospheric pressure exceeding said enclosure pressure; and port means associated with said first restricting orifice to provide an unrestricted communication between said spring chamber portion and enclosure.

12. A pressure relief, vacuum relief and dump valve comprising, in combination: a passage providing communication between an enclosure and ambient atmosphere; a butterfly valve member disposed in and adapted normally to close said passage; a valve body; a chamber formed within said body; a primary diaphragm secured to said body, disposed in said chamber and adapted to divide said chamber into two portions; compound linkage means operatively connecting said diaphragm with said valve member; a primary compression spring arranged in one of said portions and adapted to engage said diaphragm normally to urge said valve member toward a closed position; a first restricting orifice through which normally to deliver enclosure pressure to said one of said portions of said chamber; a second restricting orifice through which normally to deliver ambient atmospheric pressure to the outer one of said portions of said chamber; a pair of pilot valves; a second diaphragm operatively associated with said pilot valves; means to expose opposite sides of said secondary diaphragm to enclosure pressure and to atmospheric pressure; spring mean normally closing said pilot valves; passage means providing communication between said pilot valves and respective portions of said chamber, thereby, upon movement of said secondary diaphragm, to reverse the effective forces of said pressures acting upon said primary diaphragm and to open said valve member; electrical means operable independent from said pilot valves to reverse said pressures; manually operable means to override the forces of said primary compression spring and of said pressures acting upon said primary diaphragm, thereby, to open said butterfly valve member; an unrestricted port associated with said second restricting orifice through which to expose said diaphragm to ambient atmospheric pressure upon such atmospheric pressure exceeding said enclosure pressure; and port means associated with said first restricting orifice to provide an unrestricted communication between said one of said chamber portions and enclosure.

13. In a relief valve: passage means providing communication between an enclosure and ambient atmosphere; a closure member arranged in and normally adapted to close said passage means; a movable wall, said movable wall being of annular configuration and disposed about said passage means; linkage means operatively connecting said movable wall with said closure member; restricted passage means normally to expose one side of said movable wall to enclosure pressure; restricted passage means normally to expose the other side of said movable wall to ambient atmospheric pressure; pilot valve means operable in response to a predetermined differential between enclosure pressure and ambient atmospheric pressure, to reverse the effective forces of said pressures acting upon said movable wall, thereby to open said closure member; manually operable means to override said pressures acting upon said movable wall to open said closure member; and means independent from said pilot valve means to reverse said pressures.

14. A relief valve comprising, in combination: a passage providing communication between an enclosure and ambient atmosphere; a butterfly valve closure member arranged in and normally adapted to close said passage; a movable wall, said movable wall having an annular configuration and being disposed about said passage; means operatively connecting said movable wall to said closure member; means normally to expose one side of said movable wall to said enclosure pressure; means normally to expose the other side of said movable wall to ambient atmospheric pressure; and a pilot valve having pressure responsive actuating means operable, in response to a predetermined differential between enclosure pressure and ambient atmospheric pressure and disposed to reverse the effective forces of said pressures acting upon said movable wall thereby, to open said closure member.

15. A relief valve comprising, in combination: a passage providing communication between an enclosure and ambient atmosphere; a butterfly valve closure member arranged in and adapted normally to close said passage; a flexible diaphragm operatively associated with said closure member, said diaphragm being of annular configuration and disposed about said passage; tension spring means adapted to urge said diaphragm in a direction to close said closure member; means normally to expose said diaphragm to a differential between enclosure pressure and ambient atmospheric pressure in a manner assisting said tension spring means in normally closing said closure member; means to reverse the effective forces of said pressures acting upon said diaphragm, thereby to open said closure member against the force of said tension spring means; and manually operable lever means to override said spring force and said pressures acting upon said diaphragm to open said closure members.

16. A combination pressure relief, vacuum relief and dump valve comprising: a passage structure providing communication between an enclosure and ambient atmosphere; a valve member disposed in and adapted normally to close said passage structure; an annular valve body disposed about said passage structure; a chamber formed within said valve body; a primary diaphragm secured to said body, disposed in said chamber and adapted to divide said chamber into two portions, said diaphragm having an annular configuration; linkage means operatively connecting said diaphragm with said valve member; a spring arranged in one of said portions and adapted to co-operate with said diaphragm normally to urge said valve member toward a closed position; means normally to deliver enclosure pressure to said one of said portions of said chamber; means normally to deliver ambient atmospheric pressure to the other one of said portions of said chamber; a pair of pilot valves; a secondary diaphragm operatively associated with said pilot valves; means to expose opposite sides of said secondary diaphragm to enclosure pressure and to atmospheric pressure; spring means normally closing said pilot valves; passage means providing communication between said pilot valves and respective portions of said chamber, thereby, upon movement of said secondary diaphragm, to reverse the effective forces of said pressures acting upon said primary diaphragm and to open said valve member; and means operable independent from said pilot valves to reverse said pressures.

17. A pressure relief, vacuum relief and dump valve, comprising in combination: a passage providing communication between an enclosure and ambient atmosphere; a butterfly valve member disposed in and adapted normally to close said passage; an annular valve body disposed about said passage; a chamber formed within said body; a primary diaphragm secured to said body, disposed in said chamber and adapted to divide said chamber into two portions, said diaphragm having an annular configuration; linkage means operatively connecting said diaphragm with said valve member; tension springs arranged in one of said portions of said chamber and adapted to co-operate with said diaphragm normally to urge said valve member toward a closed position; a first restricting orifice through which normally to deliver enclosure pressure to said one of said portions of said chamber; a second restricting orifice through which normally to deliver ambient atmospheric pressure to the other one of said portions of said chamber; a pair of pilot valves; a secondary diaphragm operatively associated with said pilot valves; means to expose opposite sides of said secondary diaphragm to enclosure pressure and to atmospheric pressure; spring means normally closing said pilot valve; passage means providing communication between said pilot valves and respective portions of said chamber, thereby, upon movement of said secondary diaphragm, to reverse the effective forces of pressures acting upon said primary diaphragm and to open said valve member; electrical means operable independent from said pilot valves to reverse said pressures; manually operable means to override the forces of said tension springs and of said pressures acting upon said primary diaphragm, thereby to open said butterfly valve member; an unrestricted port associated with said second restricting orifice through which to expose said diaphragm to ambient atmospheric pressure upon such atmospheric pressure exceeding such enclosure pressure; and port means associated with said first restricting orifice to provide an unrestricted communication between said one of said chamber portions and said enclosure.

References Cited in the file of this patent

UNITED STATES PATENTS

| | | |
|---|---|---|
| 2,316,416 | Gregg | Apr. 13, 1943 |
| 2,393,343 | Schroeder | Jan. 22, 1946 |
| 2,399,326 | Crot | Apr. 30, 1946 |
| 2,424,764 | Marshall | July 29, 1947 |
| 2,672,086 | Jensen | Mar. 16, 1954 |